No. 862,919. PATENTED AUG. 13, 1907.
J. D. ISAACS & J. B. SPEED.
HELICALLY CORRUGATED PIPE.
APPLICATION FILED JUNE 23, 1905.
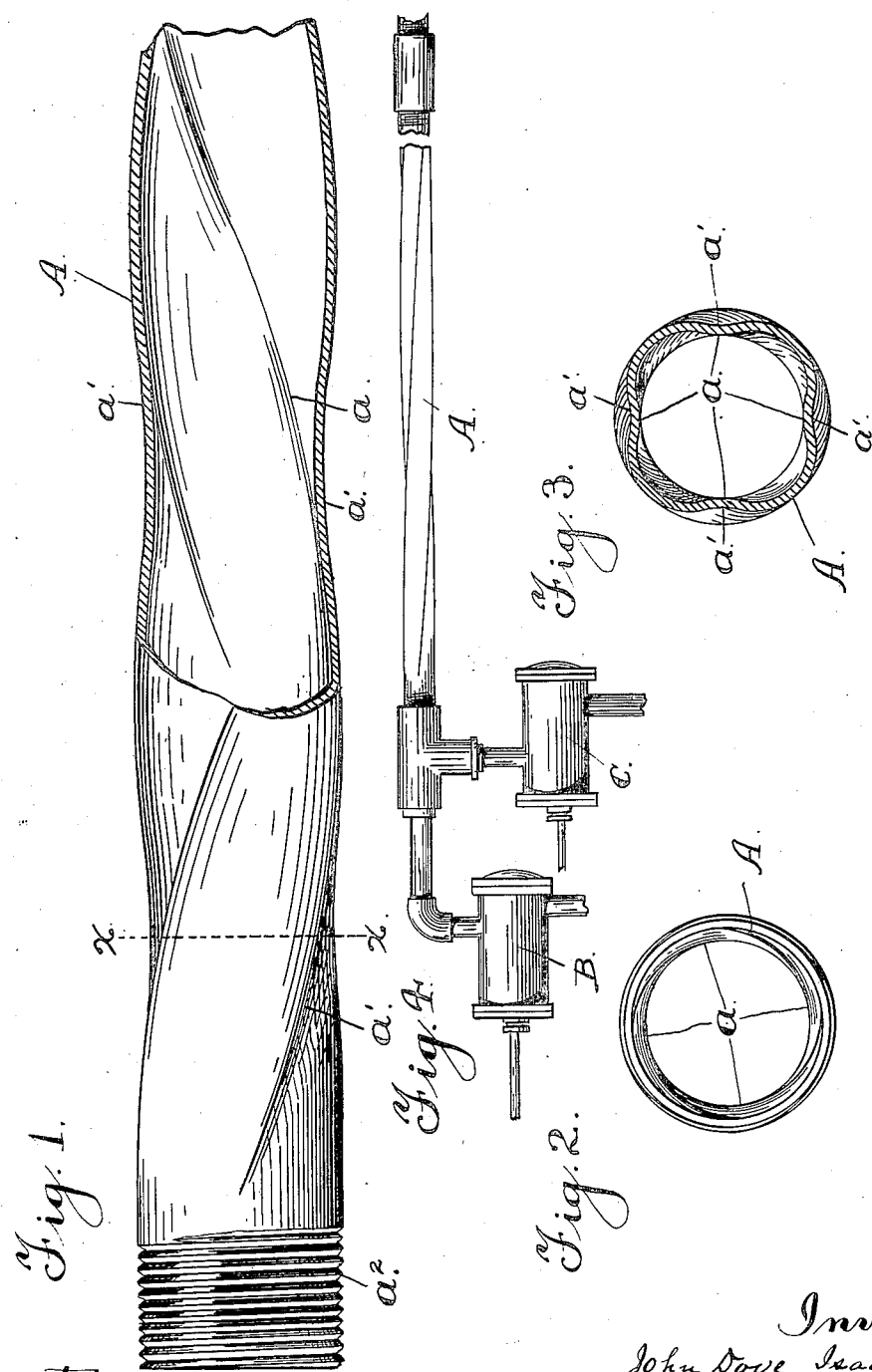

UNITED STATES PATENT OFFICE.

JOHN DOVE ISAACS, OF OAKLAND, AND JAMES BUCKNER SPEED, OF BERKELEY, CALIFORNIA, ASSIGNORS TO RIFLED PIPE COMPANY, OF SAN FRANCISCO, CALIFORNIA, A CORPORATION OF CALIFORNIA.

HELICALLY-CORRUGATED PIPE.

No. 862,919.　　　Specification of Letters Patent.　　　Patented Aug. 13, 1907.

Application filed June 23, 1905. Serial No. 266,576.

*To all whom it may concern:*

Be it known that we, JOHN DOVE ISAACS, a citizen of the United States, and a resident of Oakland, Alameda county, State of California, and JAMES BUCKNER SPEED, a citizen of the United States, and a resident of Berkeley, Alameda county, State of California, have invented certain new and useful Improvements in Helically-Corrugated Pipes; and we hereby declare the following to be a full, clear, and exact description of the same.

Our invention relates to a pipe constructed for and adapted to be used in connection with that art or method of piping a fluid, which consists in advancing the fluid, together with a second fluid of greater specific gravity, through the pipe, with a helical motion about the axis of the fluid content, whereby the fluid of greater specific gravity is caused to form an envelop about the fluid of lesser specific gravity, thereby reducing the friction against the pipe walls. This art or method is fully disclosed in Letters Patent of the United States No. 759,374, granted to us May 10, 1904, to which patent reference is hereby made. In this method the necessary helical motion of the fluid content of the pipe is, in practice, produced by means of a helically directed obstruction of some kind upon and throughout the interior of the pipe line. We have found that a certain form and construction of the helical obstruction within the pipe is well adapted for the purpose, in that it effects the necessary motion with great facility, and maintains it with proper accuracy.

Our invention has for its object the provision of a pipe to be used in a pipe-line for this purpose, which is economical in its manufacture and especially effective in securing the result desired.

To this end our invention consists in the novel pipe, which we shall now describe, by reference to the accompanying drawings in which Figure 1 is a side elevation, partly broken, of the helically corrugated pipe, the corrugations both in pitch and depth being purposely exaggerated for the sake of illustration. Fig. 2 is an end view of the pipe. Fig. 3 is a cross section of the same on line $x$—$x$ of Fig. 1. Fig. 4 is a side view of the helically corrugated pipe-line, showing it in connection with means for supplying it with the two fluids.

The pipe-line A consists of a plurality of sections coupled together. Each pipe section, for the purpose of coupling it to adjoining sections is provided with suitable means such as the end threads $a^2$.

The interior of the pipe is formed with a single, or, preferably, a multiple helically directed elevation $a$ which in section is a relatively gentle curve, such as would follow from pressure applied by means of a roller to the exterior of the pipe, which pressure forms on said exterior the corresponding depressions, $a'$, as shown. This method of producing the helically corrugated pipe, enables the corrugation to be stopped before reaching the threads, $a^2$, thus leaving the threads in proper shape for coupling, which would not be the case if the pipe were corrugated to its end. We have found that this pipe formed with the relatively gentle corrugations is very effective for the use stated, in that the corrugations are sufficient to readily set up the helical motion in the pipe content, and to maintain it without interference.

B, in Fig. 4, is the pump for supplying the pipe-line with the lighter fluid, and C is the pump for supplying it with the heavier fluid.

Having thus described our invention, what we claim as new and desire to secure by Letters Patent is—

1. In an apparatus for the method stated and in combination with means for supplying the lighter and heavier fluids to a pipe line, the pipe line having a helically directed cross sectionally concavo-convex impression in its walls, the convexity being presented inwardly to form an elevation on the interior of the pipe line.

2. In an apparatus for the method stated and in combination, a pipe line having a helically directed cross sectionally concavo-convex impression in its walls, the convexity being presented inwardly to form an elevation on the interior of the pipe line, means for supplying lighter and heavier fluids to the pipe line including connected pipes, and a screw threaded connection between said means and the pipe line, the impression in the walls of the pipe line terminating short of said connection.

In witness whereof we have hereunto set our hands.

JOHN DOVE ISAACS.
JAMES BUCKNER SPEED.

Witnesses:
J. COMPTON,
D. B. RICHARDS.